United States Patent
Akahane et al.

(10) Patent No.: US 12,494,354 B2
(45) Date of Patent: Dec. 9, 2025

(54) SUBSTRATE PROCESSING SYSTEM, INFORMATION PROCESSING APPARATUS, AND INFORMATION PROCESSING METHOD FOR DYNAMIC CONTROL OF SUBSTRATE PLASMA PROCESSING

(71) Applicant: Tokyo Electron Limited, Tokyo (JP)

(72) Inventors: Shuhei Akahane, Miyagi (JP); Ryu Nagai, Miyagi (JP); Koki Tanaka, Miyagi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 470 days.

(21) Appl. No.: 17/961,597

(22) Filed: Oct. 7, 2022

(65) Prior Publication Data

US 2023/0115942 A1    Apr. 13, 2023

(30) Foreign Application Priority Data

Oct. 11, 2021   (JP) .................. 2021-166724

(51) Int. Cl.
*H01J 37/32* (2006.01)
*G05B 13/02* (2006.01)

(52) U.S. Cl.
CPC .... *H01J 37/32926* (2013.01); *G05B 13/0265* (2013.01)

(58) Field of Classification Search
CPC .............. G05B 13/042; G05B 13/0265; G05B 23/0221; G05B 23/024; G05B 2219/45031; H01J 37/32926
See application file for complete search history.

(56) References Cited

U.S. PATENT DOCUMENTS

| | | | |
|---|---|---|---|
| 6,633,391 B1 | 10/2003 | Oluseyi et al. | |
| 7,829,468 B2 | 11/2010 | Keil et al. | |
| 10,565,513 B2 | 2/2020 | Cantwell | |
| 2009/0154504 A1* | 6/2009 | Sato | B23K 26/082 372/24 |
| 2017/0109646 A1* | 4/2017 | David | G03F 7/70625 |
| 2018/0082201 A1* | 3/2018 | Cantwell | G06N 20/00 |
| 2018/0082826 A1* | 3/2018 | Guha | H01J 37/32082 |
| 2020/0110390 A1* | 4/2020 | Banna | G05B 19/41875 |

\* cited by examiner

*Primary Examiner* — Nicholas Klicos
(74) *Attorney, Agent, or Firm* — XSENSUS LLP

(57) ABSTRACT

A substrate processing system includes: an acquiring unit that acquires a plurality of types of time-series data for each time when a plasma processing is performed on a substrate; a learning unit that generates a number of learned abnormal value detection models corresponding to a number of the plurality of types of the time-series data by calculating a data density of each of the plurality of types of time-series data acquired in a first phase; and a quantification unit that quantifies a state in a processing space in a second phase by inputting the plurality of types of time-series data acquired in the second phase into the corresponding learned abnormal value detection models, respectively, and calculating a divergence degree from the plurality of types of the time-series data acquired in the first phase.

20 Claims, 11 Drawing Sheets

SUBSTRATE PROCESSING SYSTEM, INFORMATION PROCESSING APPARATUS, AND INFORMATION PROCESSING METHOD FOR DYNAMIC CONTROL OF SUBSTRATE PLASMA PROCESSING

CROSS-REFERENCE TO RELATED APPLICATIONS

This application is based on and claims priority from Japanese Patent Application No. 2021-166724 filed on Oct. 11, 2021 with the Japanese Patent Office, the disclosure of which is incorporated herein in its entirety by reference.

TECHNICAL FIELD

The present disclosure relates to a substrate processing system, an information processing apparatus, and an information processing method.

BACKGROUND

Attempts have been made to, for example, quantify a state inside a processing space (e.g., a processing chamber) in which a plasma processing is performed by using a plurality of types of time-series data acquired in a manufacturing process of a substrate. If the state in the processing space is quantified and a control knob can be adjusted in accordance with each state in the processing space, the substrate completed with the plasma processing may be homogenized. See, e.g., U.S. Pat. Nos. 6,633,391, 7,829,468, and 10,565,513.

SUMMARY

A substrate processing system according to an aspect of the present disclosure has, for example, a following configuration. That is, the substrate processing system includes: an acquiring unit that acquires a plurality of types of time-series data for each time when a plasma processing is performed on a substrate; a learning unit that generates a number of learned abnormal value detection models corresponding to the number of the plurality of types of the time-series data by calculating a data density of each of the plurality of types of the time-series data acquired in a first phase; and a quantification unit that quantifies a state in a processing space in a second phase by inputting the plurality of types of time-series data acquired in the second phase into the corresponding learned abnormal value detection models, respectively, and calculating a divergence degree from the plurality of types of the time-series data acquired in the first phase.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made without departing from the spirit or scope of the subject matter presented here.

Hereinafter, each embodiment will be described with reference to accompanying drawings. In the present specification and drawings, components having substantially the same functional configurations will be denoted by the same symbols, and the overlapping descriptions thereof will be omitted.

First Embodiment (System Configuration of Substrate Processing System)

Figure 1:
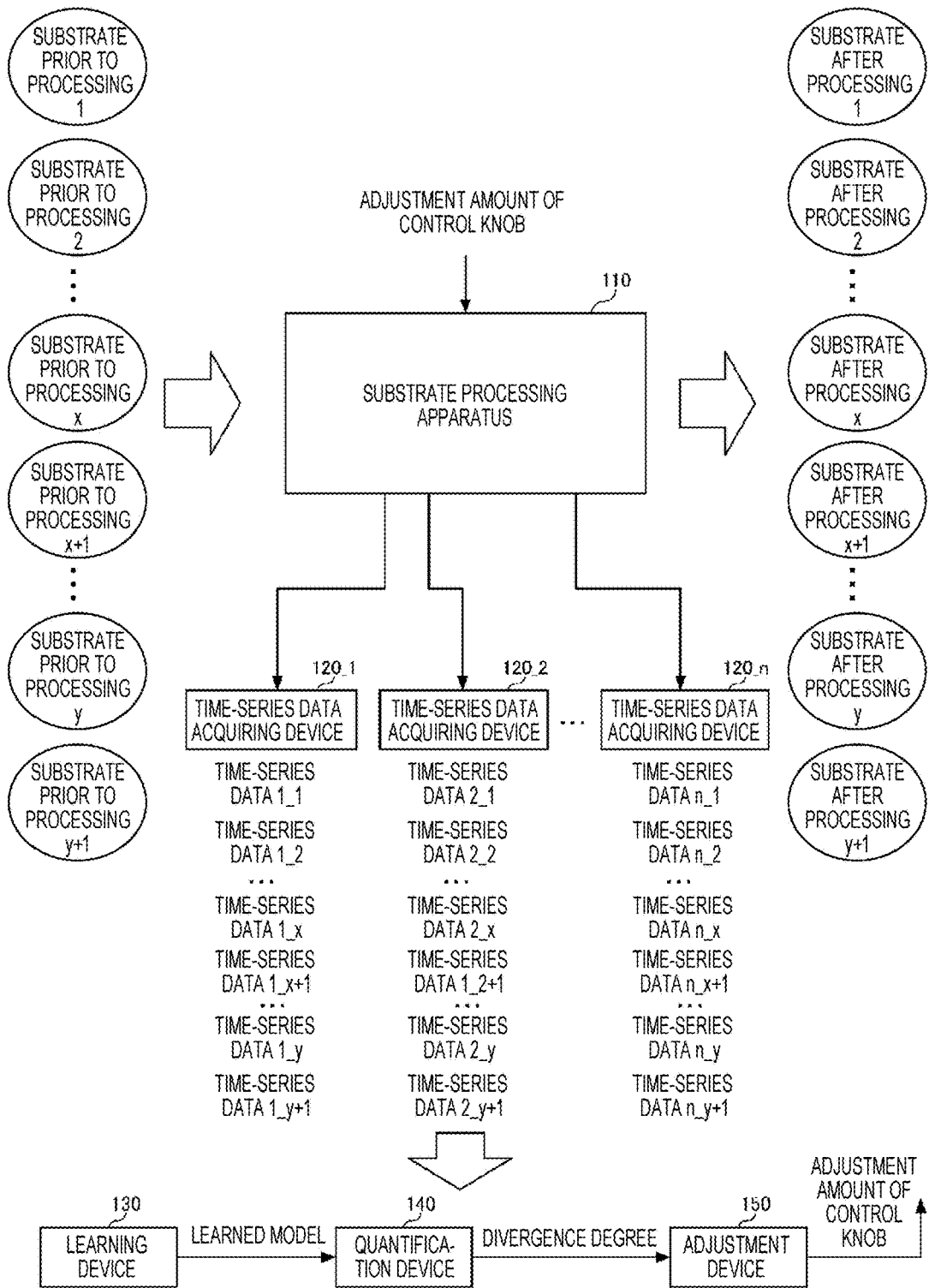
FIG. 1 is a view illustrating an example of a system configuration of a substrate processing system.

First, a system configuration of a substrate processing system will be described. FIG. 1 is a view illustrating an example of the system configuration of the substrate processing system. As illustrated in FIG. 1, a substrate processing system 100 includes a substrate processing apparatus 110, time-series data acquiring devices 120_1 to 120_n, a learning device 130, a quantification device 140, and an adjustment device 150.

The substrate processing apparatus 110 includes a processing space (chamber) in which a plasma processing is performed, and in the processing space, the plasma processing is performed on target objects (substrates 1, 2, . . . etc. prior to the processing) and resultant products (substrates 1, 2, . . . etc. after the processing) are generated. Here, the substrates 1, 2, . . . etc. prior to the processing refer to substrates before the plasma processing is performed in the processing space, and the substrates 1, 2, . . . etc. refer to substrates after the plasma processing is performed in the processing space.

The time-series data acquiring devices 120_1 to 120_n are examples of acquiring units, and acquire time-series data prior to or during the plasma processing of the substrates 1, 2, . . . etc. prior to the processing in each processing space. The time-series data acquiring devices 120_1 to 120_n may measure measurement items of different types, and the number of measurement items measured by each of the time-series data acquiring devices 120_1 to 120_n may be one or more.

In FIG. 1, time-series data 1_1 to time-series data n_1 are time-series data acquired by the time-series data acquiring devices 120_1 to 120_n prior to or during the plasma processing of the "substrate 1 prior to the processing."

Similarly, time-series data 1_2 to time-series data n_2 are time-series data acquired by the time-series data acquiring devices 120_1 to 120_n prior to or during the plasma processing of the "substrate 2 prior to the processing."

Further, the example in FIG. 1 illustrates time-series data acquired prior to or during the plasma processing of a substrate x prior to the processing, a substrate x+1 prior to the processing, a substrate y prior to the processing, and a substrate y+1 prior to the processing.

As will be described later, an operation phase of the substrate processing system 100 is classified into a learning phase (an example of a first phase), a quantification phase (an example of a second phase), and an adjustment phase (an example of a third phase).

Among these, a plurality of types of the time-series data acquired in the learning phase is sent to the learning device 130. Meanwhile, a plurality of types of the time-series data acquired in the quantification phase is sent to the quantification device 140.

The learning device 130 calculates a data density at each time for each of the plurality of types of the time-series data acquired in the learning phase, and learns a range of an abnormal value. Each learned model that has been learned the range of the abnormal value is notified to the quantification device 140.

The quantification device 140 inputs the plurality of types of the time-series data acquired in the quantification phase into corresponding learned models, respectively, and calculates a data density at each time for each of the plurality of types of the time-series data to detect the abnormal value. Further, the quantification device 140 calculates, for each of the plurality of types of the time-series data acquired in the quantification phase, a divergence degree from each of the corresponding plurality of types of the time-series data acquired in the learning phase, based on the detected abnormal value. Therefore, in the quantification device 140, a state in the processing space (chamber condition) when the plasma processing is performed on the substrate prior to the processing may be quantified. The divergence degree, which is a state in the quantified processing space, is notified to the adjustment device 150.

The adjustment device 150 calculates an adjustment amount of a control knob in accordance with the state in the processing space notified from the quantification device 140, and notifies the substrate processing apparatus 110 of the control knob that needs to be adjusted and the calculated adjustment amount. Therefore, in the substrate processing apparatus 110, when performing the plasma processing on the next substrate prior to the processing, a plasma processing suitable for the state in the processing space may be performed.

In the description of FIG. 1, details of the plurality of types of the time-series data are not mentioned, but, for example, process data measured by various sensors included in the substrate processing apparatus 110 may be included in the plurality of types of the time-series data. Further, the process data mentioned here may include: for example, RF/DC data: radio-frequency power of plasma processing, reflected power, voltage, current, or magnetic force;

Gas pressure data: pressure in the processing space, FCS pressure, pipe pressure, gas supply pressure, valve opening degree, or rear surface He pressure;

Gas flow rate data: RCS flow rate, MFC flow rate, pump rotation speed, pump current value, or pump temperature;

Driving data: motor current value, motor torque, or motor rotation speed; and

Temperature data: wall surface temperature, coolant temperature, electrode temperature, or substrate temperature. Alternatively, the plurality of types of the time-series data may include: for example, instead of or in addition to the process data, Light emission data: light emission intensity data of each wavelength, measured by a light emission spectroscopic analysis device. Alternatively, the plurality of types of the time-series data may include: for example, instead of or in addition to the process data, Spectroscopic data: spectroscopic measurement data of each wavelength of substrate or wall surface, measured by a spectral reflectometer. Alternatively, the plurality of types of the time-series data may include: for example, instead of or in addition to the process data, Mass analysis data: the number of detected intensity data corresponding to the number of types of values (m/z values) related to mass, measured by a mass analysis device (e.g., quadrupole mass analysis device). Alternatively, the plurality of types of the time-series data may include: for example, instead of or in addition to the process data, Ion data: ion energy distribution or ion angle distribution, measured by a plasma measurement device.

(Hardware Configuration of Learning Device)

Figure 2:
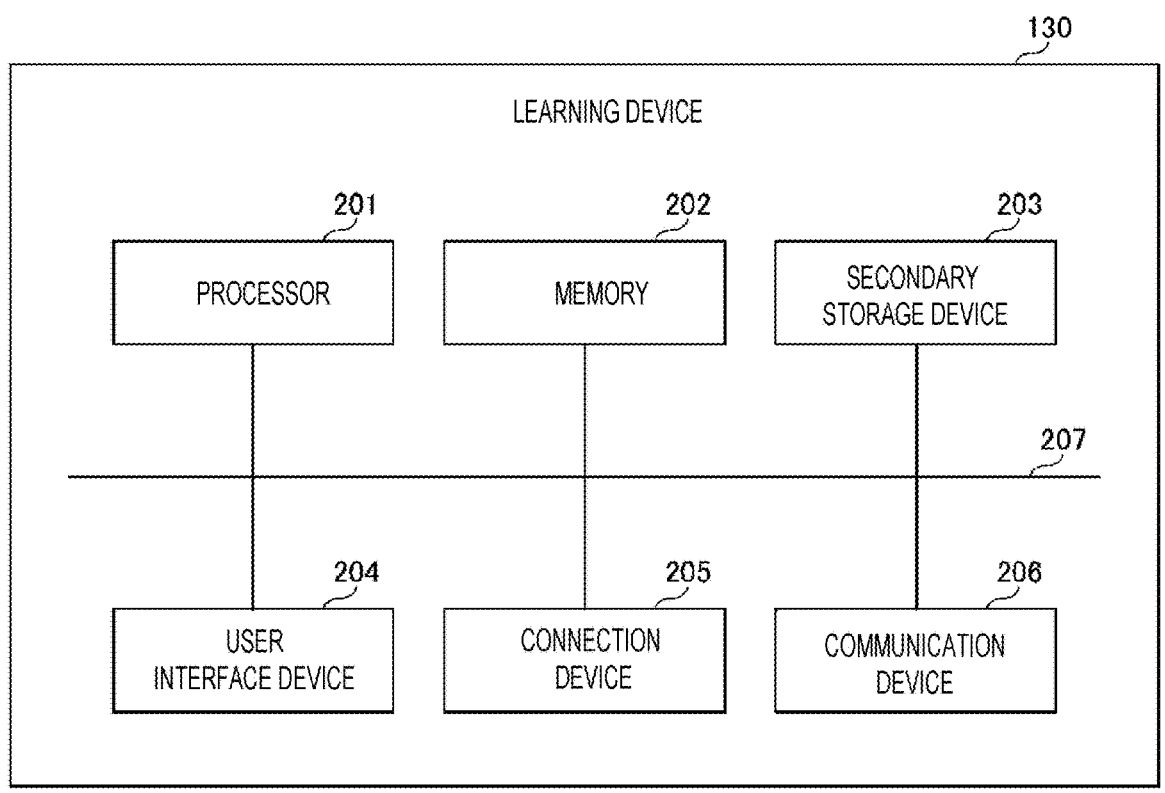
FIG. 2 is a view illustrating an example of a hardware configuration of a learning device.

Subsequently, hardware configurations of the learning device 130, the quantification device 140, and the adjustment device 150 will be described. Since the learning device 130, the quantification device 140, and the adjustment device 150 have the same hardware configuration, the hardware configuration of the learning device 130 will be described. FIG. 2 is a view illustrating an example of the hardware configuration of the learning device.

As illustrated in FIG. 2, the learning device 130 includes a processor 201, a memory 202, a secondary storage device 203, a user interface device 204, a connection device 205, and a communication device 206. Each hardware of the learning device 130 is connected to each other via a bus 207.

The processor 201 includes various computing devices such as a central processing unit (CPU) or a graphics processing unit (GPU). The processor 201 reads and executes various programs (e.g., learning program to be described) on the memory 202.

The memory 202 includes a main storage device such as a read only memory (ROM) or a random access memory (RAM). The processor 201 and the memory 202 constitutes so-called a computer, and the processor 201 executes the read various program on the memory 202, and thus, the computer implements various functions.

The secondary storage device 203 stores various programs, or various data used when the various programs are executed by the processor 201.

The user interface device 204 includes, for example, a keyboard or a touch panel on which a user of the learning device 130 performs an input operation of various commands, and a display that displays processing contents of the learning device 130.

The connection device 205 is a connection device that is connected to other devices in the substrate processing system 100. The communication device 206 is a communication device configured to communicate with an external device (not illustrated) via a network.

(Operation Phase of Substrate Processing System)

Figure 3:
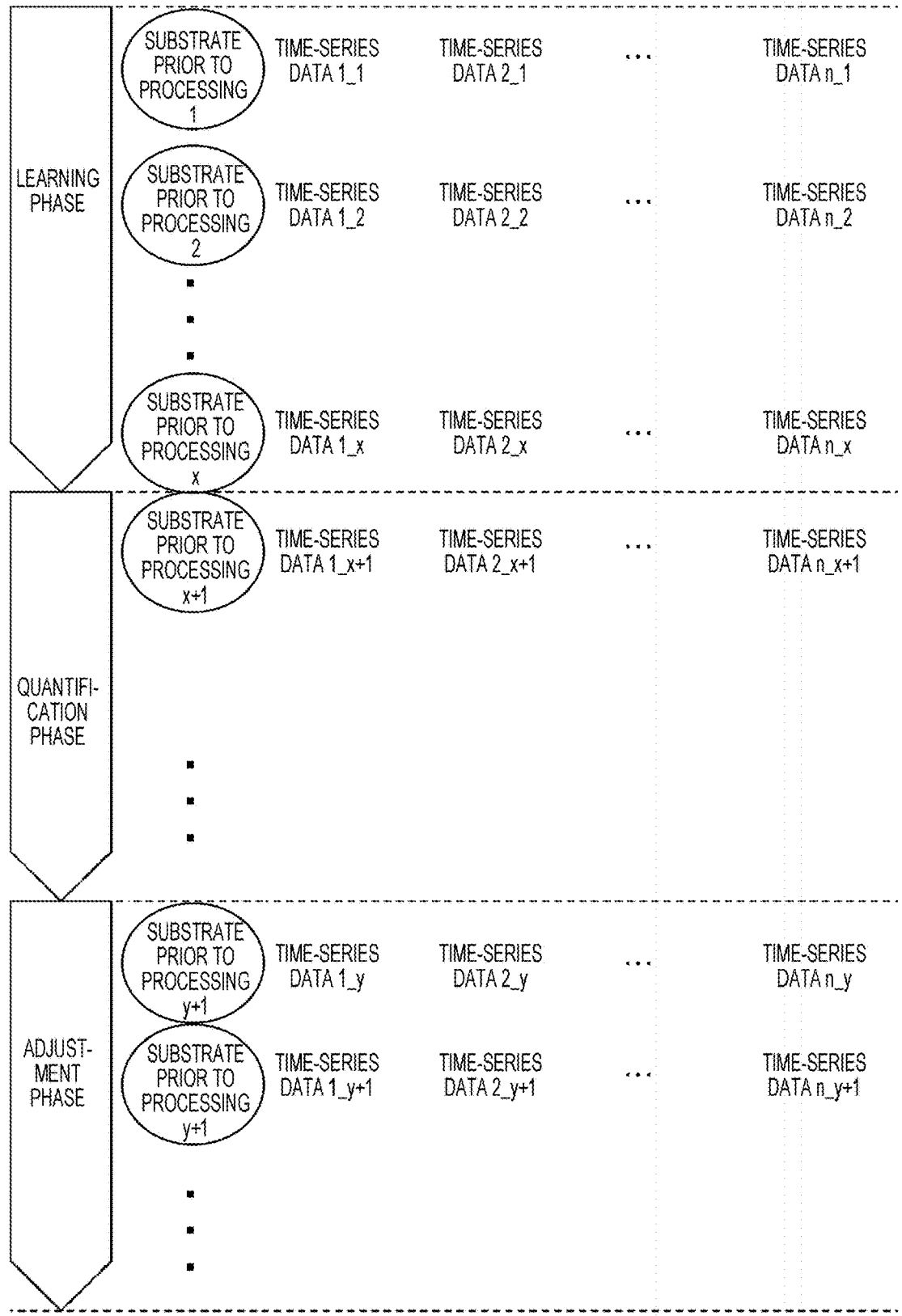
FIG. 3 is a view illustrating an example of a plurality of types of time-series data acquired for each time when a plasma processing is performed on a substrate prior to a processing in each phase.

Subsequently, a relationship between an operation phase of the substrate processing system 100 and the time-series data. FIG. 3 is a view illustrating an example of a plurality of types of time-series data acquired for each time when a plasma processing is performed on a substrate prior to the processing in each phase.

An example in FIG. 3 illustrates a case where the plasma processing is performed on the substrate 1 prior to the processing to the substrate x prior to the processing in the learning phase. In this case, the learning device 130 is notified of:

A plurality of types of time-series data (time-series data 1_1 to time-series data n_1) acquired when the plasma processing is performed on the substrate 1 prior to the processing to A plurality of types of time-series data (time-series data 1_x to time-series data n_x) acquired when the plasma processing is performed on the substrate x prior to the processing.

Therefore, in the learning device 130, the data density at each time for each of the plurality of types of the time-series data that are notified is calculated, and the range of the abnormal value is learned. As a result, the learning device 130 generates a number (n) of learned models corresponding to the number of the types of the time-series data.

Further, the example in FIG. 3 illustrates a case where the plasma processing is performed on the substrate x+1 prior to the processing in the quantification phase. In this case, the quantification device 140 is notified of:

A plurality of types of time-series data (time-series data 1_x+1 to time-series data n_x+1) acquired when the plasma processing is performed on the substrate x+1 prior to the processing.

Therefore, in the quantification device 140, the plurality of types of the time-series data that are notified are input into the corresponding n number of learned models, and the divergence degree is calculated from each of the corresponding plurality of types of the time-series data acquired in the learning phase. As a result, in the quantification device 140, a state in the processing space (chamber condition) when the plasma processing is performed on the substrate x+1 prior to the processing may be quantified.

Further, the example in FIG. 3 illustrates a situation where the substrate processing apparatus 110 performs the plasma processing on the substrate y prior to the processing, the substrate y+1 prior to the processing, . . . in the adjustment phase in which the adjustment device 150 adjusts the control knob based on the divergence degree, which is the state in the quantified processing space.

In this manner, in the state where the control knob is adjusted based on the state in the processing space quantified in the quantification phase, the plasma processing is performed in the adjustment phase, and thus, the plasma processing suitable for the state in the processing space may be performed in the adjustment phase.

A switching timing of the operation phase of the substrate processing system 100 is arbitrary. For example, when the plasma processing is performed on a predetermined number of substrates prior to the processing, it may be configured to be switched from the learning phase to the quantification phase. Further, when the plasma processing is performed on the predetermined number of substrates prior to the processing, it may be configured to be switched from the quantification phase to the adjustment phase. At this time, the substrate processing system 100 may be configured to switch all phases in one lot, or may be configured to switch each phase over a plurality of lots.

Further, the acquisition order of the plurality of types of the time-series data in the learning phase and the quantification phase by the substrate processing system 100 is arbitrary. For example, as illustrated in FIG. 3, it may be configured to acquire the plurality of types of the time-series data in the order of the learning phase to the quantification phase. Specifically, it may be configured such that the plurality of types of the time-series data acquired in the quantification phase becomes the time-series data acquired when the plasma processing is performed on a substrate prior to the processing after the substrate prior to the processing on which the plasma processing is performed in the learning phase.

Alternatively, the substrate processing system 100 may be configured to acquire the plurality of types of the time-series data in the order of the quantification phase to the learning phase. Specifically, it may be configured such that the plurality of types of the time-series data acquired in the quantification phase becomes the time-series data acquired when the plasma processing is performed on a substrate prior to the processing before the substrate prior to the processing on which the plasma processing is performed in the learning phase.

Further, an execution pattern of the operation phase in the substrate processing system 100 is arbitrary, and the substrate processing system 100 may be configured, for example, to execute the quantification phase and the adjustment phase in parallel. Specifically, it may be configured such that the plurality of types of the time-series data (time-series data 1_y to time-series data n_y) acquired when the plasma processing is performed on the substrate y prior to the processing, or the time-series data y+1 in the adjustment phase is notified to the quantification device 140. Therefore, the substrate processing system 100 may execute the quantification phase in parallel with the adjustment phase.

As a result, for example, in the adjustment phase, the adjustment device 150 adjusts the control knob based on the state in the quantified processing space at each time when the plasma processing is performed on a constant number of substrates prior to the processing, and thus, the plasma processing may be performed based on the control knob after the adjustment.

However, also in this case, the adjustment amount of the control knob used when the plasma processing is performed in the adjustment phase is calculated based on the divergence degree calculated in the immediately preceding quantification phase.

Further, in the substrate processing system 100, the number of executions of the learning phase and the quantification phase is arbitrary. For example, the substrate processing system 100 may be configured such that the learning phase and the quantification phase are executed multiple times within the same lot, or are executed once each time when the lot is switched. Alternatively, in a case where the plasma processing is performed on a plurality of lots using the same recipe, the learning phase and the quantification phase may be executed once each time when the recipe is switched. Alternatively, the learning phase and the quantification phase may be executed once each time when the plasma processing is performed on a predetermined number of lots (or when the plasma processing is performed on a predetermined number of substrates prior to the processing). Alternatively, the learning phase and the quantification phase may be executed once at a predetermined time.

(Functional Configuration of Analysis Device)

Figure 4:
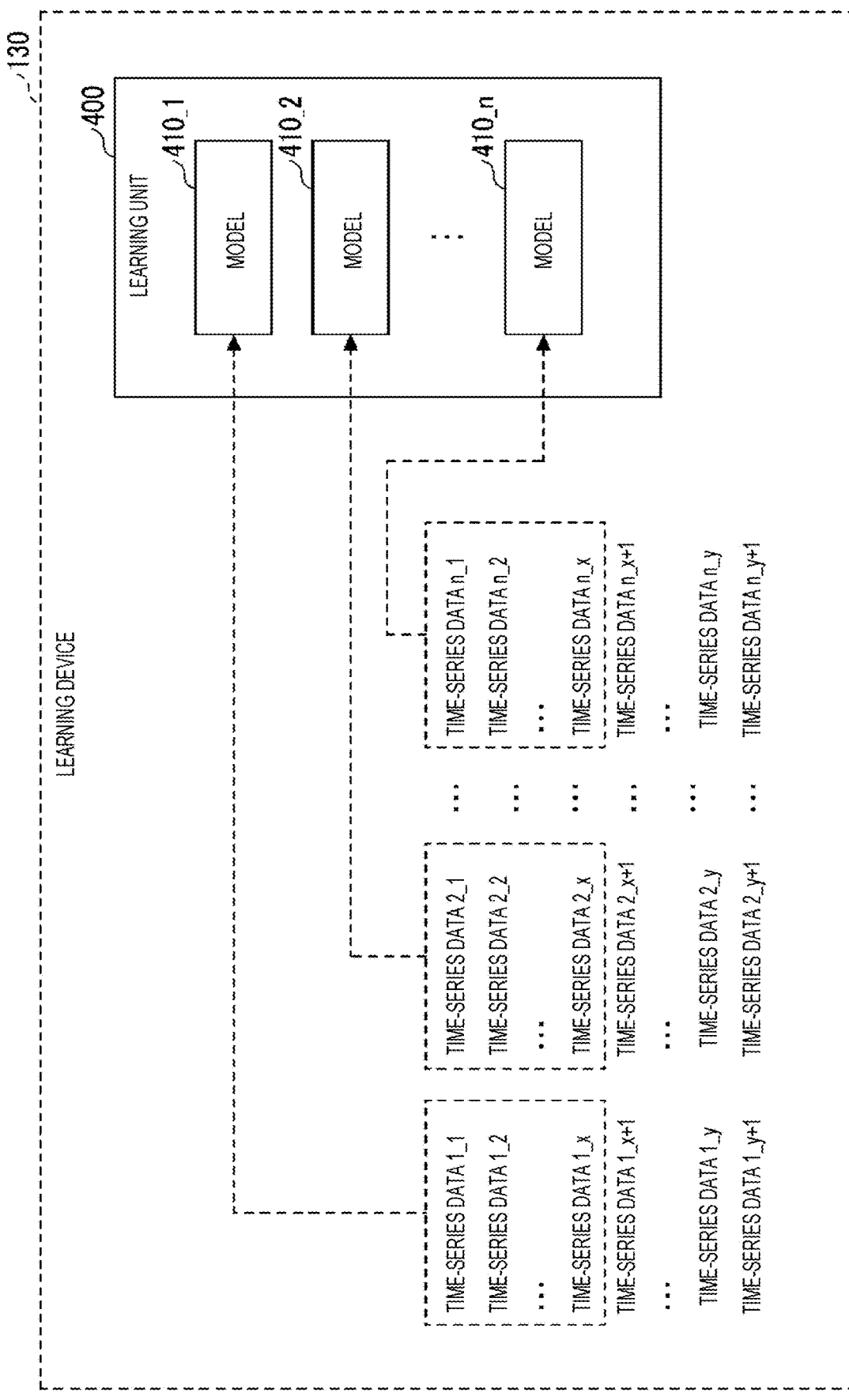
FIG. 4 is a view illustrating an example of a functional configuration of the learning device.

Subsequently, a functional configuration of the analysis device 130 will be described. FIG. 4 is a view illustrating an example of the functional configuration of the learning device. A learning program is installed in the learning device 130, and the learning device 130 functions as a learning unit 400 by executing the program.

As illustrated in FIG. 4, the learning unit 400 includes a number of abnormal value detection models (model 410_1 to model 410_$n$) corresponding to the number of types of the time-series data.

The time-series data 1_1 acquired by the time-series data acquiring device 120_1 by performing the plasma processing on the substrate 1 prior to the processing in the learning phase to The time-series data 1_x acquired by the time-series data acquiring device 120_1 by performing the plasma processing on the substrate x prior to the processing in the learning phase are input into the model 410_1. Therefore, the model 410_1 calculates a data density of each time with respect to the time-series data acquired by the time-series data acquiring device 120_1 for each time when the plasma processing is performed in the learning phase. Further, the model 410_1 learns the range of the abnormal value with respect to the time-series data acquired by the time-series data acquiring device 120_1 for each time when the plasma processing is performed in the learning phase. The range of the abnormal value learned by the model 410_1 in the learning phase is set in a model 510_1 (to be described later) as reference range information.

Similarly,

The time-series data 2_1 acquired by the time-series data acquiring device 120_2 by performing the plasma processing on the substrate 1 prior to the processing in the learning phase to The time-series data 2_x acquired by the time-series data acquiring device 120_2 by performing the plasma processing on the substrate x prior to the processing in the learning phase are input into the model 410_2. Therefore, the model 410_2 calculates a data density of each time with respect to the time-series data acquired by the time-series data acquiring device 120_2 for each time when the plasma processing is performed in the learning phase. Further, the model 410_2 learns the range of the abnormal value with respect to the time-series data acquired by the time-series data acquiring device 120_1 for each time when the plasma processing is performed in the learning phase. The range of the abnormal value learned by the model 410_2 in the learning phase is set in a model 510_2 (to be described later) as reference range information.

Hereinafter, in FIG. 4, since the model 410_3 to the model 410_$n$−1 are omitted, the descriptions for these abnormal value detection models will be omitted.

The time-series data n_1 acquired by the time-series data acquiring device 120_$n$ by performing the plasma processing on the substrate 1 prior to the processing in the learning phase to The time-series data n_x acquired by the time-series data acquiring device 120_$n$ by performing the plasma processing on the substrate x prior to the processing in the learning phase are input into the model 410_$n$. Therefore, the model 410_$n$ calculates a data density of each time with respect to the time-series data acquired by the time-series data acquiring device 120_$n$ for each time when the plasma processing is performed in the learning phase. Further, the model 410_$n$ learns the range of the abnormal value with respect to the time-series data acquired by the time-series data acquiring device 120_$n$ for each time when the plasma processing is performed in the learning phase. The range of the abnormal value learned by the model 410_$n$ in the learning phase is set in a model 510_$n$ (to be described later) as reference range information.

The reference range information set in each of the model 510_1 to the model 510_$n$ is arbitrary. When the plurality of types of the time-series data input into each of the model 410_1 to the model 410_$n$ are, for example, the time-series data acquired when the plasma processing is performed under a state where the state in the processing space is a normal state, the reference range information is information indicating the normal range. Further, when the plurality of types of the time-series data input into each of the model 410_1 to the model 410_$n$ are, for example, the time-series data acquired when the plasma processing is performed under a state where the state in the processing space is an abnormal state, the reference range information is information indicating the abnormal range.

Alternatively, it may be assumed that the plurality of types of the time-series data input into each of the model 410_1 to the model 410_$n$ include The plurality of types of the time-series data acquired when the plasma processing is performed under the state where the state in the processing space is the normal state, and.

The plurality of types of the time-series data acquired when the plasma processing is performed under the state where the state in the processing space is the abnormal state. In this case, in the learning unit 400, for example, a processing is performed along the following procedure.

The plurality of types of the time-series data acquired when the plasma processing is performed under the state where the state in the processing space is the normal state are input into each of the model 410_1 to the model 410_$n$ so that the range of the abnormal value is learned, and the information indicating the normal range is calculated as the reference range information.

The plurality of types of the time-series data acquired when the plasma processing is performed under the state where the state in the processing space is the abnormal state are input into the model 410_1 to the model 410-$n$, in which the learning is performed, and a detection accuracy of the abnormal value detected based on the calculated normal range is validated.

Among the model 410_1 to the model 410_$n$, a model having a high detection accuracy of the abnormal value is specified as a model that is used in the quantification phase.

(Functional Configuration of Quantification Device)

Figure 5:
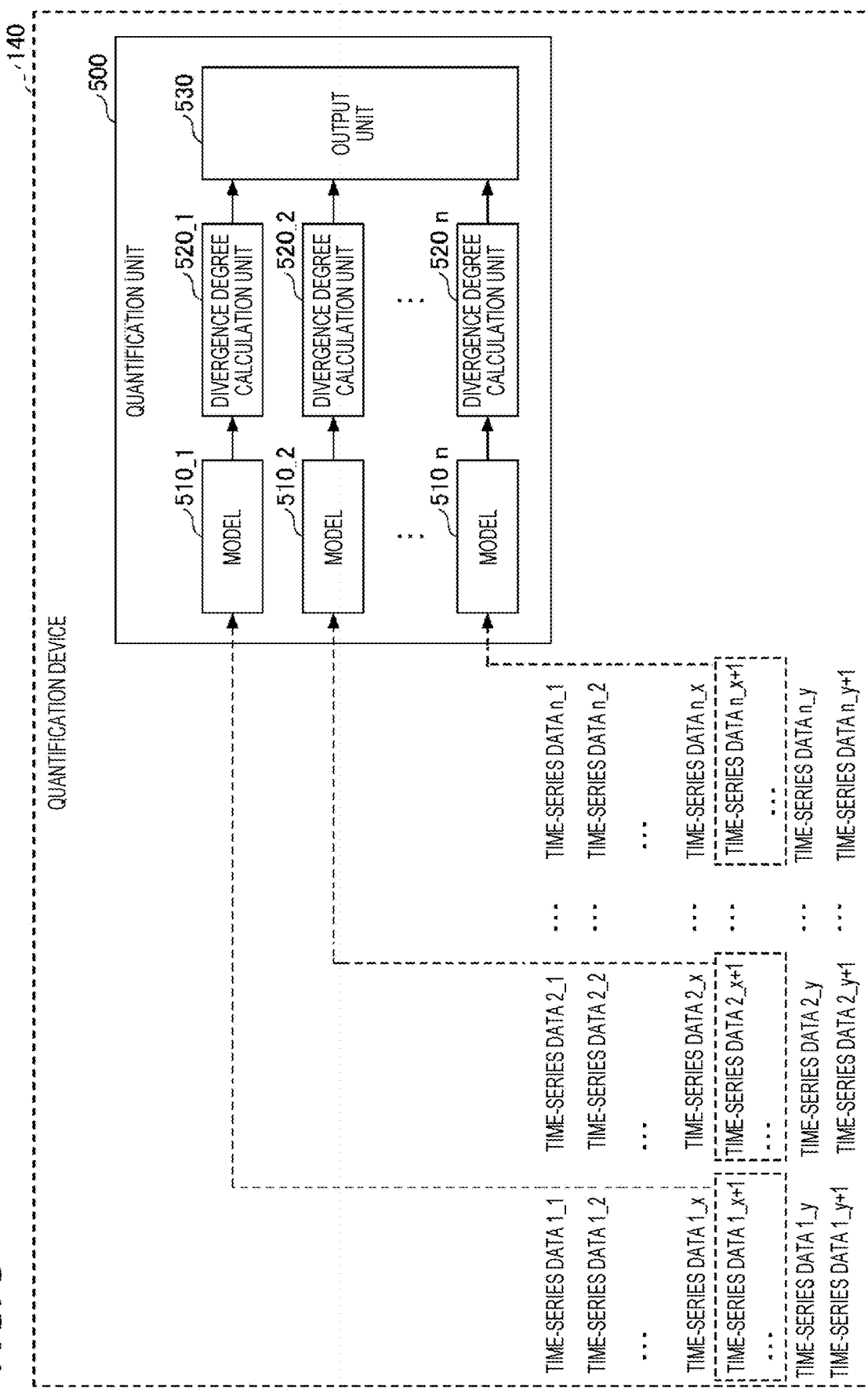
FIG. 5 is a view illustrating an example of a functional configuration of a quantification device.

Subsequently, a functional configuration of the quantification device 140 will be described. FIG. 5 is a view illustrating an example of the functional configuration of the quantification device. A quantification program is installed in the quantification device 140, and the quantification device functions as a quantification unit 500 by executing the program.

As illustrated in FIG. 5, the quantification unit 500 includes a number of abnormal value detection models (model 510_1 to model 520__n_) corresponding to the number of types of the time-series data, and divergence degree calculation units (divergence degree calculation unit 520_1 to 520__n_). Further, the quantification unit 500 includes an output unit 530.

The time-series data 1_x+1 acquired by the time-series data acquiring device 120_1 by performing the plasma processing on the substrate x+1 prior to the processing in the quantification phase is input into the model 510_1. Therefore, the model 510_1 calculates a data density of each time with respect to the time-series data acquired by the time-series data acquiring device 120_1 for each time when the plasma processing is performed. Further, the model 510_1 detects the abnormal value of the time-series data based on the set reference range information, and notifies the divergence degree calculation unit 520_1 of the abnormal value.

Similarly,

The time-series data 2_x+1 acquired by the time-series data acquiring device 120_2 by performing the plasma processing on the substrate x+1 prior to the processing in the quantification phase is input into the model 510_2. Therefore, the model 510_2 calculates a data density of each time with respect to the time-series data acquired by the time-series data acquiring device 120_2 for each time when the plasma processing is performed. Further, the model 510_2 detects the abnormal value of the time-series data based on the set reference range information, and notifies the divergence degree calculation unit 520_2 of the abnormal value.

Hereinafter, in FIG. 5, since the model 510_3 to the model 510__n_−1 are omitted, the descriptions for these abnormal value detection models will be omitted.

The time-series data n_x+1 acquired by the time-series data acquiring device 120__n_ by performing the plasma processing on the substrate x+1 prior to the processing in the quantification phase is input into the model 510__n_. Therefore, the model 510__n_ calculates a data density of each time with respect to the time-series data acquired by the time-series data acquiring device 120__n_ for each time when the plasma processing is performed. Further, the model 510__n_ detects the abnormal value of the time-series data based on the set reference range information, and notifies the divergence degree calculation unit 520__n_ of the abnormal value.

The divergence degree calculation unit 520_1 aggregates the divergence degree of the entire time-series data 1_x+1 based on binary information indicating the abnormal value detected by the model 510_1, and notifies the output unit 530 of the divergence degree.

Similarly, the divergence degree calculation unit 520_2 aggregates the divergence degree of the entire time-series data 2_x+1 based on binary information indicating the abnormal value detected by the model 510_2, and notifies the output unit 530 of the divergence degree.

Hereinafter, in FIG. 5, since the divergence degree calculation unit 520_3 to the divergence degree calculation unit 520__n_−1 are omitted, the descriptions for these divergence degree calculation units will be omitted.

The divergence degree calculation unit 520__n_ aggregates the divergence degree of the entire time-series data n_x+1 based on binary information indicating the abnormal value detected by the model 510__n_, and notifies the output unit 530 of the divergence degree.

The output unit 530 specifies the divergence degree calculation unit corresponding to a pre-specified model (or model specified by the learning unit 400) among the models 510_1 to 510__n_. Further, the output unit 530 notifies the adjustment device 150 that the divergence degree notified by the specified divergence degree calculation unit is the state in the processing space (chamber condition) quantified in the quantification phase.

(Specific Example of Divergence Degree)

Figure 6:
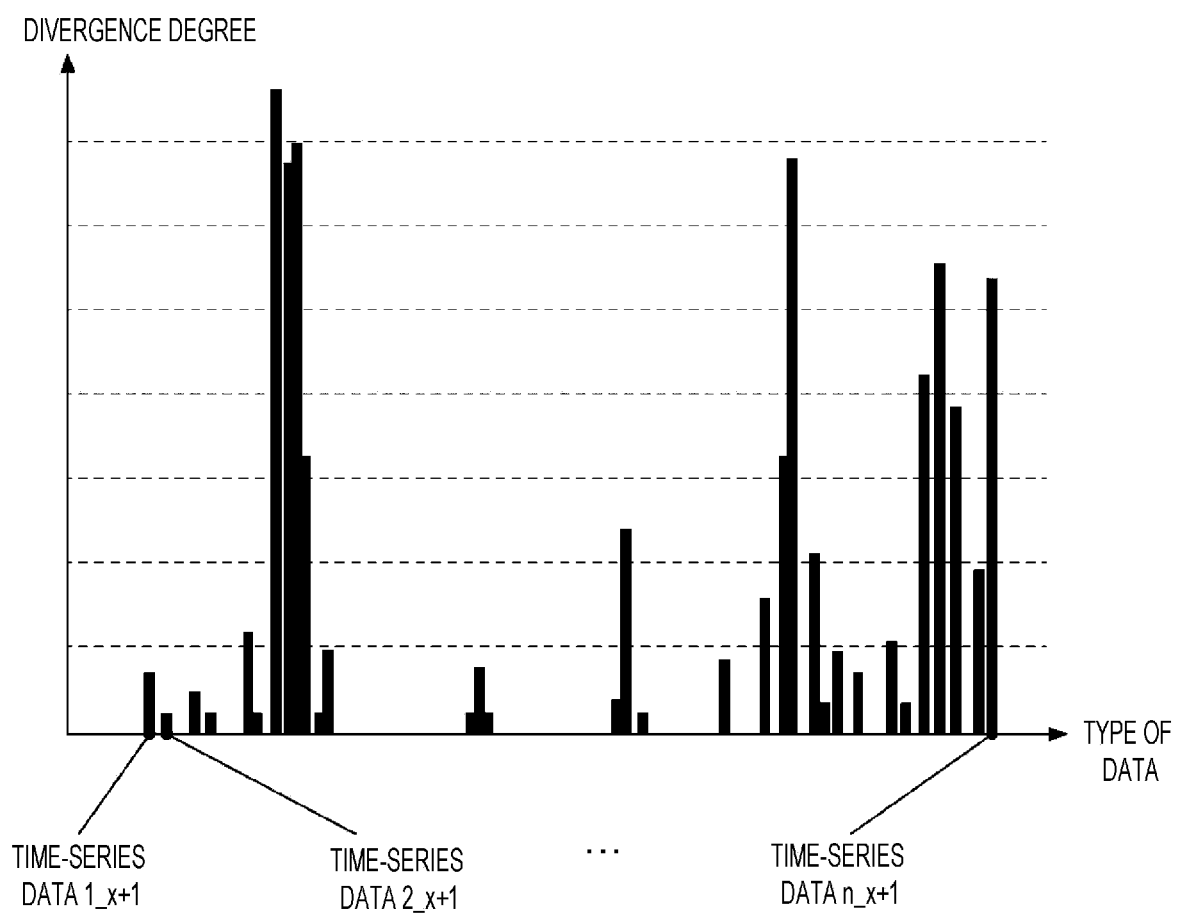
FIG. 6 is a view illustrating a specific example of a divergence degree of each of a plurality of types of time-series data.

Subsequently, a specific example of the divergence degree output from each of the divergence degree calculation units 520_1 to 520__n_ will be described. FIG. 6 is a view illustrating a specific example of a divergence degree of each of a plurality of types of time-series data. In FIG. 6, the horizontal axis represents the types of the time-series data. Further, the vertical axis represents the divergence degree of the entire time-series data calculated with respect to each of the plurality of types of the time-series data acquired in the quantification phase.

As illustrated in the example in FIG. 6, depending on the type of the time-series data, the time-series data acquired in the quantification phase may be diverged greatly from the time-series data acquired in the learning phase.

Therefore, by focusing on the divergence degree of a specific type of the time-series data, it is possible to grasp the change in the state in the processing space in the quantification phase with respect to the learning phase.

(Functional Configuration of Adjustment Device)

Figure 7:
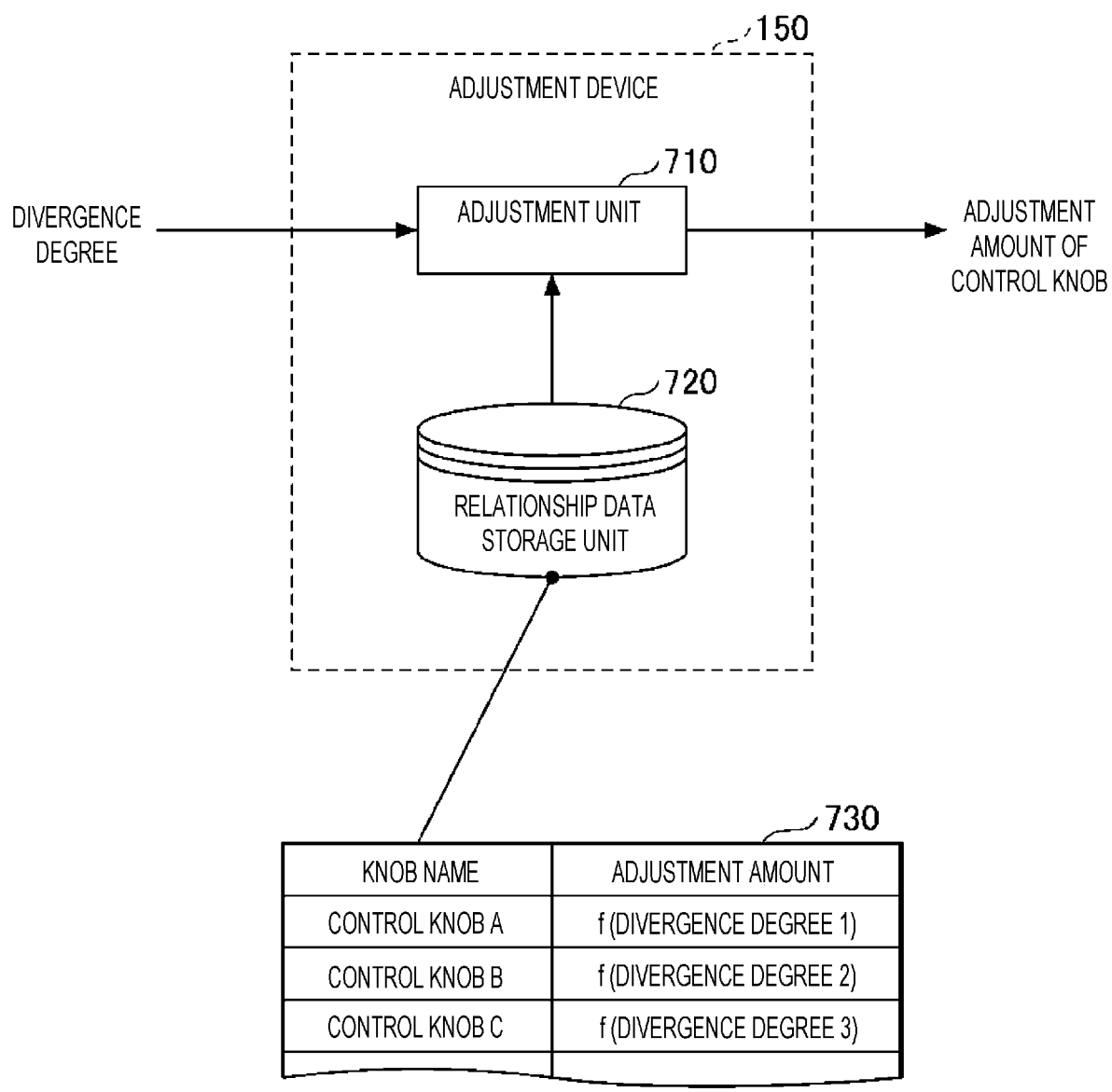
FIG. 7 is a view illustrating an example of a functional configuration of an adjustment device.

Subsequently, a functional configuration of the adjustment device 150 will be described. FIG. 7 is a view illustrating an example of the functional configuration of the adjustment device. An adjustment program is installed in the adjustment device 150, and the adjustment device 150 functions as an adjustment unit 710 by executing the program.

The adjustment unit 710 refers to a relationship data storage unit 720 when acquiring the divergence degree, which is the state in the processing space quantified by the quantification device 140. In the relationship data storage unit 720, a table 730 in which a correspondence relationship between the divergence degree output from the divergence degree calculation unit corresponding to a specific model and the adjustment amount of the corresponding control knob is experimentally obtained in advance.

In the adjustment unit 710, the adjustment amount of the corresponding control knob is calculated based on the divergence degree output from the divergence degree calculation unit corresponding to a specific model by referring to the table 730. The example in FIG. 7 illustrates the calculation of the adjustment amount ("f(divergence degree 1)") of the corresponding control knob ("control knob A") based on the divergence degree ("divergence degree 1") output from the divergence degree calculation unit 520_1 corresponding to the model 510_1. Further, the example in FIG. 7 illustrates the calculation of the adjustment amount ("f(divergence degree 2)") of the corresponding control knob ("control knob B") based on the divergence degree ("divergence degree 2") output from the divergence degree calculation unit 520_2 corresponding to the model 510_2. Further, the example in FIG. 7 illustrates the calculation of the adjustment amount ("f(divergence degree 3)") of the corresponding control knob ("control knob C") based on the divergence degree ("divergence degree 3") output from the divergence degree calculation unit 520_3 corresponding to the model 510_3.

(Flow of Optimization Processing by Substrate Processing System)

Figure 8:
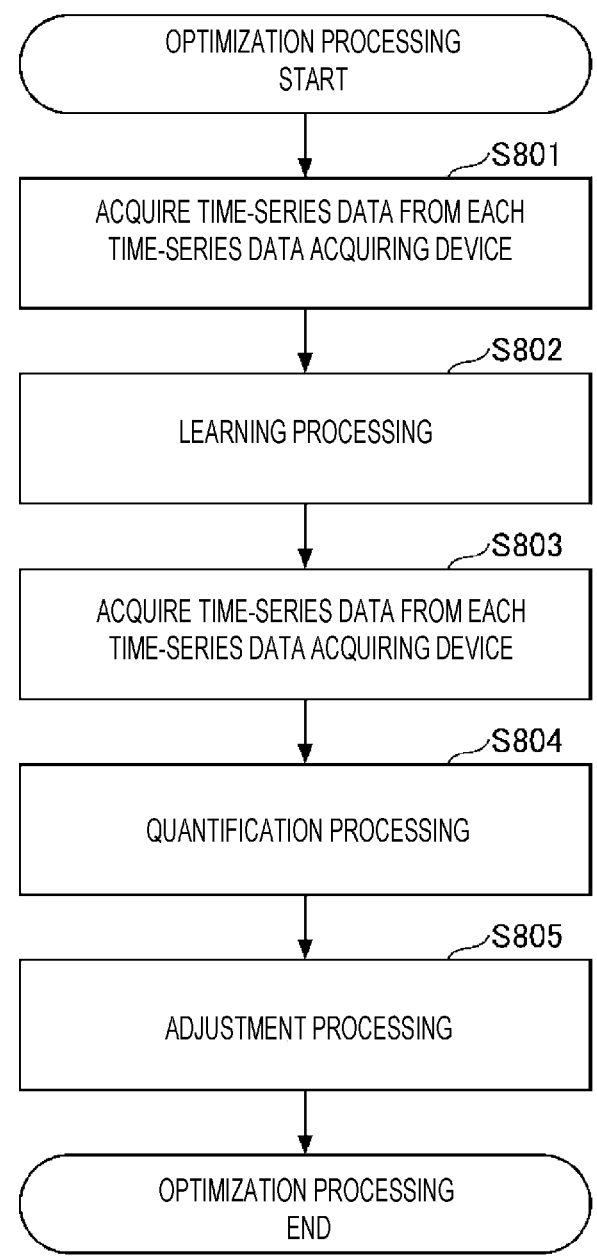
FIG. 8 is a flowchart illustrating a flow of an optimization processing.

Subsequently, in the plasma processing by the substrate processing system 100, a flow of an optimization processing that optimizes the plasma processing by quantifying the state in the processing space and adjusting the control knob in accordance with each state will be described. FIG. 8 is a flowchart illustrating the flow of the optimization processing. The flowchart in FIG. 8 illustrates a flow of an optimization process in a case where the learning phase, the quantification phase, and the adjustment phase are executed once at a predetermined timing.

In step S801, the learning device 130 acquires a plurality of types of the time-series data acquired by each time-series data acquiring device when the plasma processing is performed by the substrate processing apparatus 110 in the learning phase.

In step S802, the learning device 130 calculates the data density at each time by inputting the plurality of types of the time-series data acquired in the learning phase into the corresponding models, respectively, and learns the range of the abnormal value. Therefore, the learning device 130 generates a number of learned models corresponding to the number of the types of the time-series data.

In step S803, the quantification device 140 acquires a plurality of types of the time-series data acquired by each time-series data acquiring device when the plasma processing is performed by the substrate processing apparatus 110 in the quantification phase.

In step S804, the quantification device 140 calculates the data density at each time by inputting the plurality of types of the time-series data acquired in the quantification phase into the corresponding learned models, respectively, and detects the abnormal value. Further, the quantification device 140 calculates, for each of the plurality of types of the time-series data acquired in the quantification phase, the divergence degree from each of the corresponding plurality of types of the time-series data acquired in the learning phase, based on the detected abnormal value. Further, the quantification device 140 notifies the adjustment device 150 that the divergence degree corresponding to a specific learned model is the state in the quantified processing space.

In step S805, the adjustment device 150 calculates the adjust amount of the corresponding control knob based on the divergence degree, which is the state in the quantified processing space. Further, the adjustment device 150 notifies the substrate processing apparatus 110 of the control knob required to be adjusted and the calculated adjustment amount in the adjustment phase.

(Summary)

As can be clearly seen from the above description, the substrate processing system 100 according to the first embodiment:

Acquires a plurality of types of time-series data for each time when the plasma processing is performed on the substrate prior to the processing;

Calculates the data density of each of the plurality of types of the time-series data acquired in the learning phase, and learns the range of the abnormal value. Therefore, a number of learned abnormal value detection models corresponding to the number of the types of the time-series data are generated.

Inputs the plurality of types of the time-series data acquired in the quantification phase into the corresponding learned abnormal value detection models, respectively. Therefore, the divergence degree is calculated from the plurality of types of the time-series data acquired in the learning phase, and the state in the processing space in the quantification phase is quantified.

As a result, according to the first embodiment, the state in the processing space in which the plasma processing is performed may be quantified.

Example

Continuously, an example of the substrate processing system 100 according to the first embodiment will be described. The example executes each operation phase based on the configuration examples such as:

Substrate processing apparatus: etching processing apparatus,

Time-series data acquiring devices 120_1 to 120_*n*: light emission spectroscopic analysis device of wavelength 200 nm to 800 nm (here, n=601), Time-series data 1_1 to time-series data 1_n: each light emission intensity data of wavelength 200 nm to 800 nm, Model: abnormal value detection model, Switching timing of the operation phase: within one lot, Substrate prior to the processing in the learning phase: tenth substrates prior to the processing within one lot, Substrate prior to the processing in the quantification phase: first and ninth substrates prior to the processing within one lot, and Substrate prior to the processing in the adjustment phase: substrate prior to the processing after an eleventh substrate within one lot.

(1) Specific Example of Light Emission Intensity Data

Figure 9:
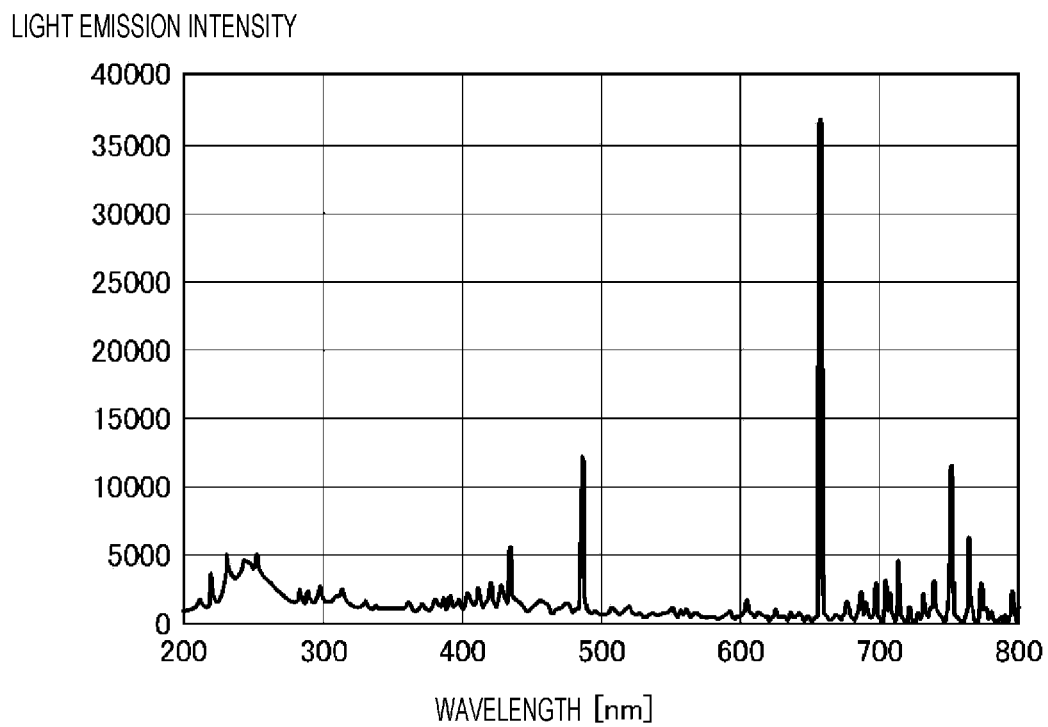
FIG. 9 is a view illustrating an example of light emission intensity data acquired by a light emission spectroscopic analysis device.

FIG. 9 is a view illustrating an example of light emission intensity data acquired by a light emission spectroscopic analysis device. In FIG. 9, the horizontal axis represents a wavelength of 200 nm to 800 nm, and the vertical axis represents a light emission intensity of each wavelength at a predetermined time. In the example, the light emission intensity data (see, FIG. 9) of each wavelength during the plasma processing is acquired as a plurality of types of the time-series data.

(2) Specific Example of Operation Phase

Figure 10:
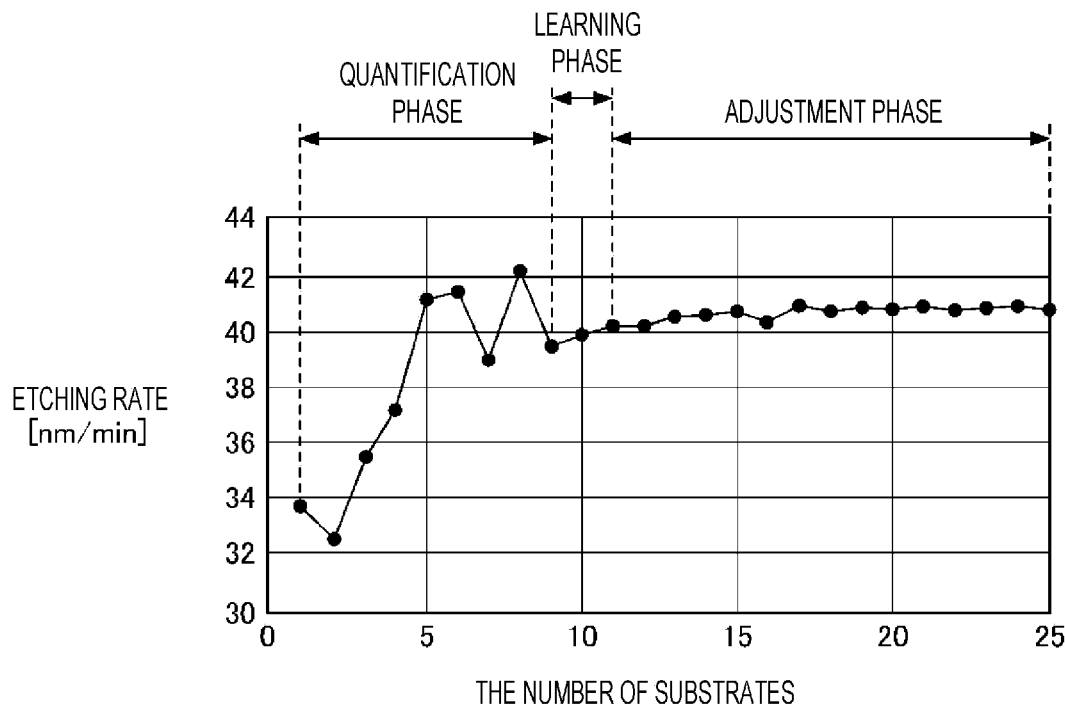
FIG. 10 is a view illustrating a relationship between a transition in an etching rate when a plasma processing is performed on a plurality of substrates prior to a processing, and an operation phase in the embodiment.

FIG. 10 is a view illustrating a relationship between a transition in an etching rate when the plasma processing is performed on a plurality of substrates prior to the processing, and the operation phase in the embodiment. In FIG. 10, the horizontal axis represents the number of the plasma-processed substrates prior to the processing, and the vertical axis represents an etching rate when the plasma processing is performed on each substrate prior to the processing. Further, the operation phase when the plasma processing is performed on each substrate prior to the processing is illustrated in the upper part.

In the example in FIG. 10, the etching rate is low in a case where the number of the plasma-processed substrates prior to the processing is small, and the etching rate is high in a case where the number of the plasma-processed substrates prior to the processing increases, and eventually, there is a transition that the etching rate is stabilized.

With respect to the transition in the etching rate, in the example, the plasma processing on the tenth substrate prior to the processing is the learning phase, and the plasma processings on the first substrate prior to the processing and on the ninth substrate prior to the processing are the quantification phase. Further, the plasma processing on the substrate prior to the processing after the eleventh substrate is the adjustment phase.

Figure 11A:
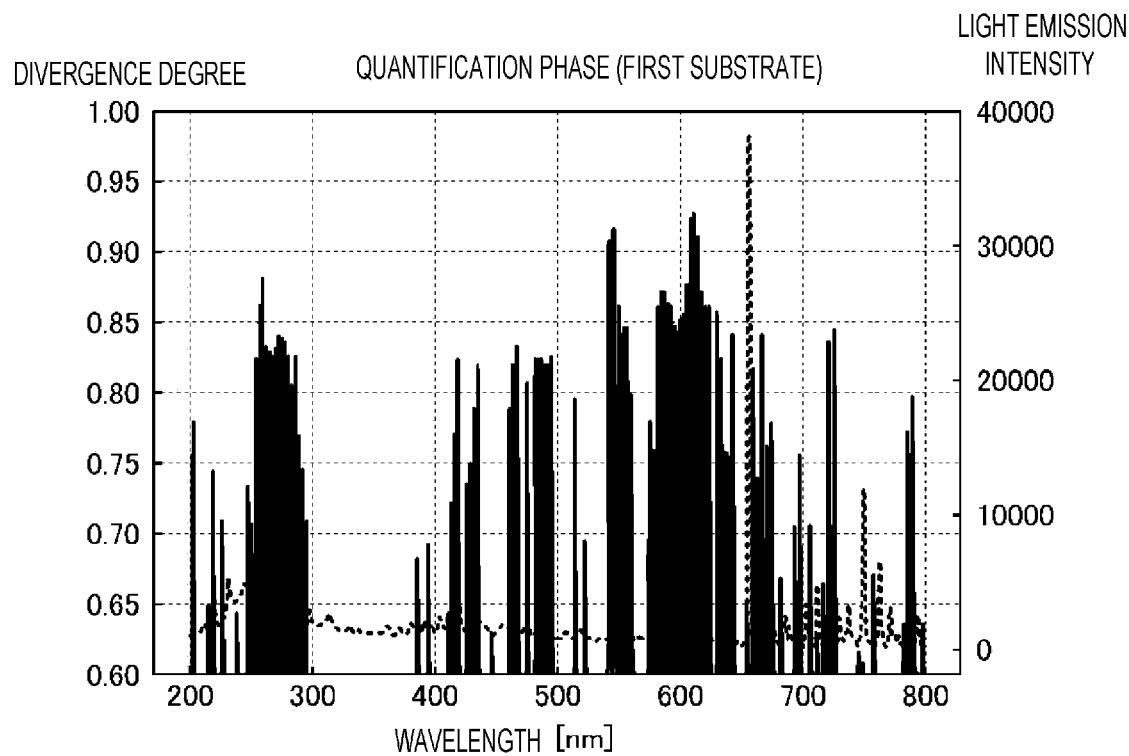
FIGS. 11A and 11B are views illustrating an example of a divergence degree of light emission intensity data of each wavelength in a quantification phase.
Figure 11B:
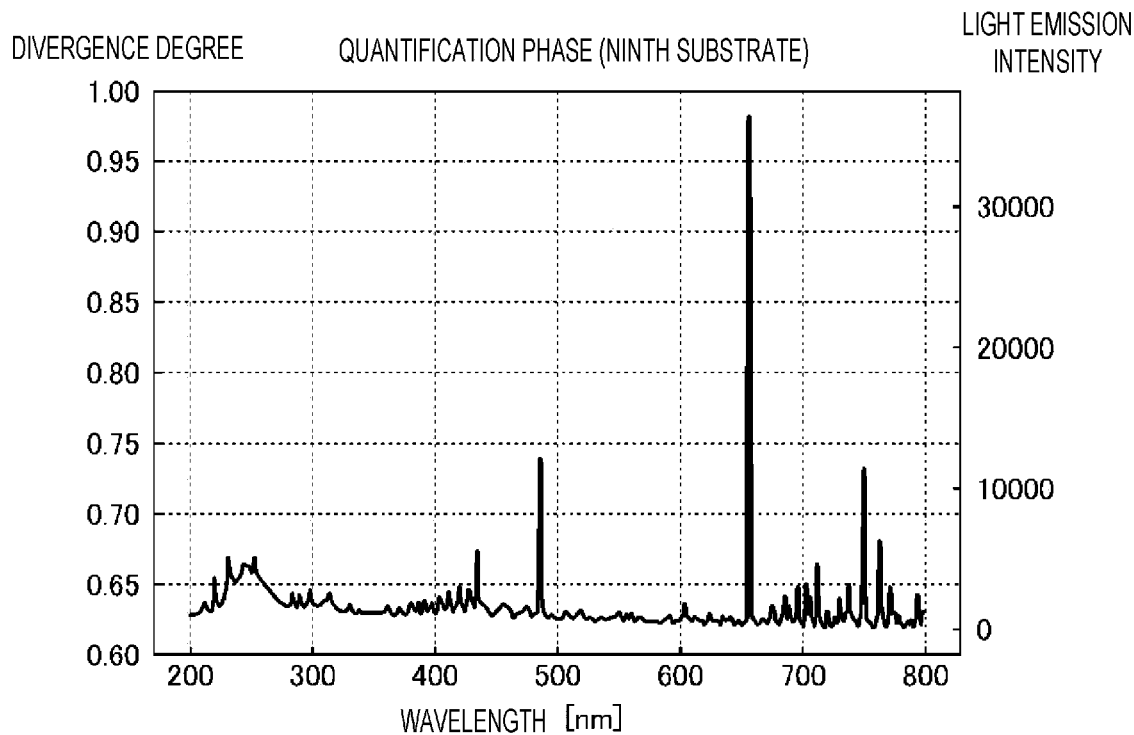

(3) Specific Example of Divergence Degree of Each Wavelength in Quantification Phase FIGS. 11A and 11B are views illustrating an example of a divergence degree of light emission intensity data of each wavelength in the quantification phase. FIG. 11A illustrates the divergence degree calculated by inputting light emission intensity data of each wavelength acquired when the plasma processing is performed on the first substrate prior to the processing, and light emission intensity data of each wavelength into the learned model in the quantification phase.

Further, FIG. 11B illustrates the divergence degree calculated by inputting light emission intensity data of each wavelength acquired when the plasma processing is performed on the ninth substrate prior to the processing, and light emission intensity data of each wavelength into the learned model in the quantification phase.

When comparing FIG. 11A and FIG. 11B, in both drawings, the light emission intensity data of each wavelength is similar to each other, but the divergence degree of a specific wavelength is significantly different. Here, the relationship between the divergence degree and the etching rate will be examined.

As illustrated in FIG. 10, the tenth plasma-processed substrate prior to the processing in the learning phase is the plasma-processed substrate prior to the processing after the etching rate is stabilized. Further, the ninth substrate prior to the processing among the plasma-processed substrates prior to the processing in the quantification phase is also the plasma-processed substrate prior to the processing after the etching rate is stabilized. That is, both substrates are plasma-processed in a case where the difference in the etching rate is small. Then, as illustrated in FIG. 11B, in the quantification phase, the light emission intensity data of each wavelength acquired when the plasma processing is performed on the ninth substrate prior to the processing has a small divergence degree with the light emission intensity data of each wavelength acquired in the learning phase.

Meanwhile, as illustrated in FIG. 10, the first substrate prior to the processing among the plasma-processed substrates prior to the processing in the quantification phase is the substrate prior to the processing that is plasma-processed before the etching rate is stabilized, which is greatly different in the etching rate in the learning phase. Then, as illustrated in FIG. 11A, in the quantification phase, the light emission intensity data of each wavelength acquired when the plasma processing is performed on the first substrate prior to the processing has a large divergence degree with the light emission intensity data of each wavelength acquired in the learning phase.

In this manner, it may be said that the divergence degree from the light emission intensity data of each wavelength acquired in the learning phase roughly represents the change in the etching rate, which is an example of the state in the processing space.

Specifically, when the plasma processing performed after the etching rate is stabilized is the learning phase, it may be said that the divergence degree from the light emission intensity data of each wavelength acquired in the learning phase represents the change from the etching rate after being stabilized.

Further, when the plasma processing performed before the etching rate is stabilized is the learning phase, it may be said that the divergence degree from the light emission intensity data of each wavelength acquired in the learning phase represents the change from the etching rate before being stabilized.

(4) Specifying Wavelength

Figure 12A:
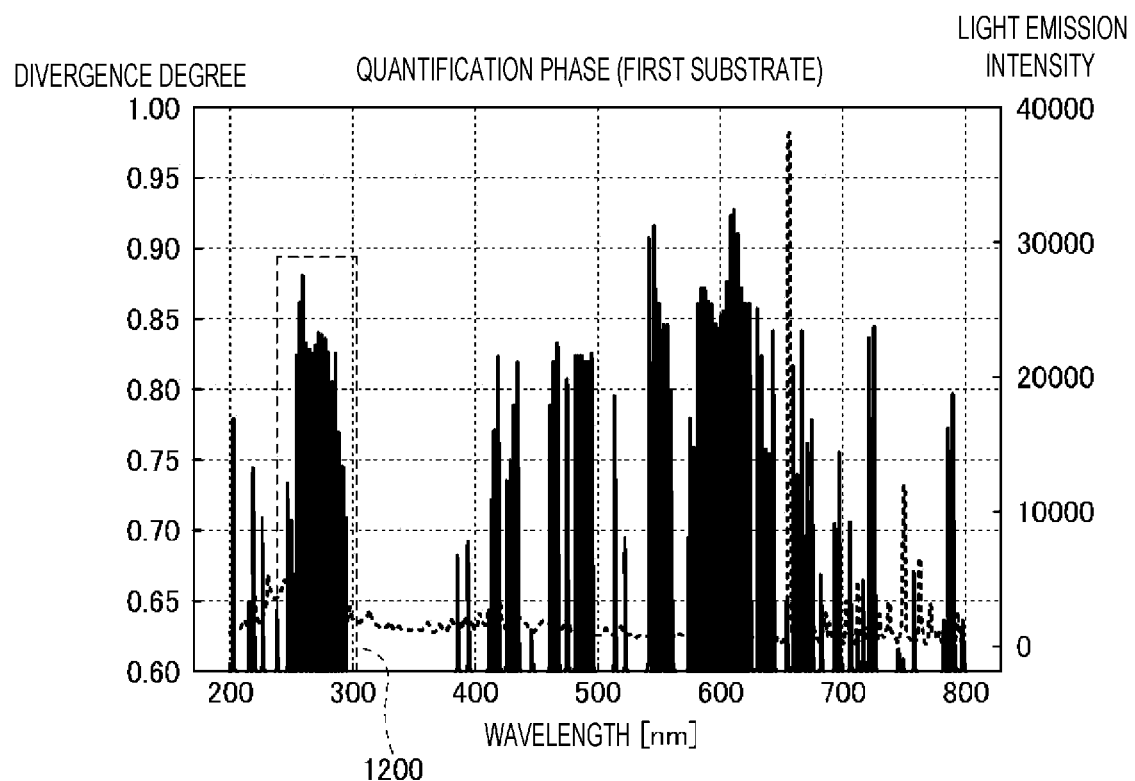
FIGS. 12A and 12B are views illustrating a relationship between a divergence degree and an etching rate at a specific wavelength.
Figure 12B:
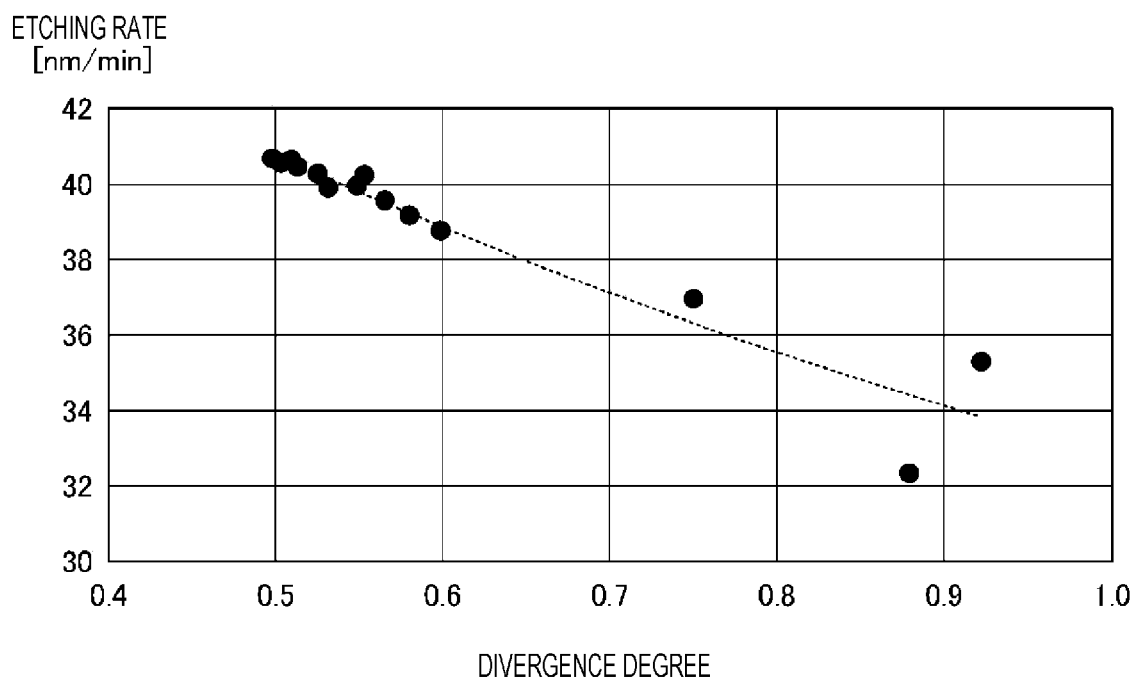

FIGS. 12A and 12B are views illustrating a relationship between the divergence degree and the etching rate at a specific wavelength. FIG. 12A is the same graph as FIG. 11A with a specific wavelength area 1200 added. Meanwhile, FIG. 12B is a view illustrating a relationship between the divergence degree and the etching rate included in the specific wavelength area 1200 illustrated in FIG. 12A.

As illustrated in FIG. 12B, the divergence degree and the etching rate at the specific wavelength has a substantially linear relationship.

Therefore, according to the example, a plasma processing suitable for the change in the etching rate may be performed by specifying the divergence degree of the wavelength included in the area 1200 among the divergence degrees of each wavelength calculated in the quantification phase, and adjusting the control knob. At this time, the control knob may be adjusted, for example, by adding the adjustment amount according to the divergence degree of the specified wavelength to the control amount of the control knob used in the learning phase (i.e., plasma processing on the tenth substrate prior to the processing).

Other Embodiments

In the first embodiment, descriptions have been made on the case where the abnormal value detection model is used, but the type of the model is not limited thereto. Other models may be used as long as they can detect the abnormal value of the data based on the data density of the time-series data.

Further, in the first embodiment, the learning device 130, the quantification device 140, and the adjustment device 150 are provided separately from the substrate processing apparatus 110. However, some or all of the learning device 130, the quantification device 140, or the adjustment device 150 may be provided integrally with the substrate processing apparatus 110.

Further, in the first embodiment, the learning device 130, the quantification device 140, and the adjustment device 150 have been described as being configured separately from each other, but some or all of these devices may be configured as an integrated information processing apparatus. In this case, an information processing program that includes some or all of the learning program executed by the learning device 130, the quantification program executed by the quantification device 140, and the adjustment program executed by the adjustment device 150 will be executed by the information processing apparatus.

According to the present disclosure, the substrate processing system, the information processing apparatus, the information processing method, and the information processing program that quantify the state in the processing space in which the plasma processing is performed may be provided.

From the foregoing, it will be appreciated that various embodiments of the present disclosure have been described herein for purposes of illustration, and that various Modifications may be made without departing from the scope and spirit of the present disclosure. Accordingly, the various embodiments disclosed herein are not intended to be limiting, with the true scope and spirit being indicated by the following claims.

What is claimed is:

1. A substrate processing system comprising:
an acquisition circuitry configured to acquire a plurality of types of time-series data for each time when a plasma processing is performed on a substrate for a processing time;
a learning circuitry configured to generate a number of learned abnormal value detection models corresponding to a number of the plurality of types of the time-series data by calculating a data density of each of the plurality of types of time-series data acquired in a first phase, the data density representing a number of data points obtained during the processing time;
a quantification circuitry configured to quantify a state in a processing space in a second phase by inputting the plurality of types of time-series data acquired in the second phase into the corresponding learned abnormal value detection models, respectively, and calculating a divergence degree by quantifying a deviation of the time-series data acquired in the second phase from the data density from the first phase for each of the plurality of types of the time-series data acquired in the first phase; and
an adjustment circuitry configured to adjust a corresponding control knob based on a specific divergence degree among the divergence degrees calculated by the quantification circuitry,
wherein, in a third phase, when the plasma processing is performed on the substrate, the plasma processing is performed by using an adjusted control knob adjusted by the adjustment circuitry.

2. The substrate processing system according to claim 1, wherein the learning circuitry generates the learned abnormal value detection models by learning a range of an abnormal value of each of the plurality of types of the time-series data acquired in the first phase based on the calculated data density.

3. The substrate processing system according to claim 2, wherein the quantification circuitry is configured to:
detect the abnormal value of each of the plurality of types of the time-series data by inputting the plurality of types of the time-series data acquired in the second phase into the corresponding learned abnormal value detection models, and
calculate the divergence degree for each of the plurality of types of the time-series data based on a detected abnormal value.

4. The substrate processing system according to claim 3, wherein the quantification circuitry is configured to calculate the divergence degree by aggregating binary information indicating the detected abnormal value over an entirety of a respective one of the plurality of types of the time-series data.

5. The substrate processing system according to claim 1, wherein the plurality of types of the time-series data acquired in the second phase are time-series data acquired when the plasma processing is performed on a substrate after the substrate on which the plasma processing is performed in the first phase.

6. The substrate processing system according to claim 1, wherein the plurality of types of the time-series data acquired in the second phase are time-series data acquired when the plasma processing is performed on a substrate before the substrate on which the plasma processing is performed in the first phase.

7. The substrate processing system according to claim 1, wherein the plurality of types of time-series data includes light emission intensity data of each of a plurality of wavelengths measured by a light emission spectroscopic analysis device.

8. The substrate processing system according to claim 7, wherein the quantification circuitry quantifies the state in the processing space based on a divergence degree of a specific wavelength having a substantially linear relationship with an etching rate.

9. The substrate processing system of claim 1, wherein the plurality of types of time-series data includes at least one of gas pressure data, gas flow rate data, or temperature data.

10. The substrate processing system according to claim 1, wherein the plurality of types of time-series data includes mass analysis data measured by a mass analysis device.

11. The substrate processing system according to claim 1, wherein the adjustment circuitry is configured to refer to a table that stores a correspondence relationship between the divergence degree and an adjustment amount of the corresponding control knob.

12. The substrate processing system according to claim 1, wherein the adjustment circuitry is configured to adjust the control knob by adding an adjustment amount corresponding to the specific divergence degree to a control amount of the control knob used in the first phase.

13. The substrate processing system according to claim 1, wherein the quantification circuitry is configured to execute the second phase in parallel with the adjustment circuitry executing the third phase.

14. The substrate processing system according to claim 1, wherein the first phase is executed for a first set of substrates within a lot and the second and third phases are executed for a second set of substrates within the same lot.

15. The substrate processing system according to claim 1, wherein the first phase is executed each time a recipe for the plasma processing is switched.

16. The substrate processing system according to claim 1, wherein the learned abnormal value detection models are validated using time-series data acquired when the plasma processing is performed under a known abnormal state.

17. An information processing apparatus comprising:
an acquisition circuitry configured to acquire a plurality of types of time-series data for each time when a plasma processing is performed on a substrate;
a learning circuitry configured to generate a number of learned abnormal value detection models corresponding to the number of the types of the time-series data by calculating a data density of each of the plurality of types of time-series data acquired in a first phase, the data density representing a number of data points obtained during the processing time;
a quantification circuitry configured to quantify a state in a processing space in a second phase by inputting a plurality of types of time-series data acquired in the second phase into the corresponding learned abnormal value detection models, respectively, so as to calculate a divergence degree by quantifying a deviation of the time-series data acquired in the second phase from the data density of the first phase for each of the plurality of types of the time-series data acquired in the first phase; and
an adjustment circuitry configured to adjust a corresponding control knob based on a specific divergence degree among the divergence degrees calculated by the quantification circuitry,
wherein, in a third phase, when the plasma processing is performed on the substrate, the plasma processing is performed by using an adjusted control knob adjusted by the adjustment circuitry.

18. An information processing method comprising:

acquiring a plurality of types of time-series data for each time when a plasma processing is performed on a substrate;

learning a range of target values including generating a number of learned abnormal value detection models corresponding to the number of the plurality of types of the time-series data and calculating a data density of each of the plurality of types of time-series data acquired in a first phase, the data density representing a number of data points obtained during the processing time;

quantifying a state in a processing space in a second phase by inputting the plurality of types of time-series data acquired in the second phase into the corresponding learned abnormal value detection models, respectively, and calculating a divergence degree by quantifying a deviation of the time-series data acquired in the second phase from the data density of the first phase for each of the plurality of types of the time-series data acquired in the first phase; and adjusting a corresponding control knob based on a specific divergence degree among the divergence degrees calculated, wherein, in a third phase, when the plasma processing is performed on the substrate, the plasma processing is performed by using an adjusted control knob.

19. A non-transitory computer-readable storage medium having stored therein an information processing program that causes a computer to execute an information processing method including:

acquiring a plurality of types of time-series data for each time when a plasma processing is performed on a substrate;

learning a range of target values including generating a number of learned abnormal value detection models corresponding to the number of the plurality of types of the time-series data and calculating a data density of each of the plurality of types of time-series data acquired in a first phase, the data density representing a number of data points obtained during the processing time;

quantifying a state in a processing space in a second phase by inputting the plurality of types of time-series data acquired in the second phase into the corresponding learned abnormal value detection models, respectively, and calculating a divergence degree by quantifying a deviation of the time-series data acquired in the second phase from the data density of the first phase for each of the plurality of types of the time-series data acquired in the first phase; and adjusting a corresponding control knob based on a specific divergence degree among the divergence degrees calculated, wherein, in a third phase, when the plasma processing is performed on the substrate, the plasma processing is performed by using an adjusted control knob.

20. The method according to claim 18, wherein adjusting the control knob further includes adding an adjustment amount corresponding to the specific divergence degree to a control amount of the control knob used in the first phase.

* * * * *